(12) United States Patent
Zhang et al.

(10) Patent No.: US 10,219,203 B2
(45) Date of Patent: Feb. 26, 2019

(54) WIRELESS LOCAL AREA NETWORK SCANNING METHOD AND WIRELESS ACCESS POINT

(71) Applicant: Huawei Technologies Co., Ltd., Shenzhen (CN)

(72) Inventors: Lin Zhang, Suzhou (CN); Shaobo Liu, Suzhou (CN); Daoli Yu, Suzhou (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 22 days.

(21) Appl. No.: 15/460,499

(22) Filed: Mar. 16, 2017

(65) Prior Publication Data

US 2017/0273012 A1    Sep. 21, 2017

(30) Foreign Application Priority Data

Mar. 17, 2016 (CN) .......................... 2016 1 0154723

(51) Int. Cl.
| | |
|---|---|
| *H04W 48/06* | (2009.01) |
| *H04W 28/02* | (2009.01) |
| *H04W 24/02* | (2009.01) |
| *H04W 48/16* | (2009.01) |
| *H04L 12/26* | (2006.01) |
| *H04W 84/12* | (2009.01) |
| *H04W 88/08* | (2009.01) |

(52) U.S. Cl.
CPC .............. *H04W 48/16* (2013.01); *H04L 43/12* (2013.01); *H04L 43/16* (2013.01); *H04W 28/0205* (2013.01); *H04W 48/06* (2013.01); *H04W 24/02* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2006/0092888 | A1* | 5/2006 | Jeong .................... | H04W 48/14 370/338 |
| 2006/0111103 | A1* | 5/2006 | Jeong .................... | H04W 48/14 455/434 |

(Continued)

OTHER PUBLICATIONS

Robert J. Bartz, "Chapter 5, IEEE 802.11 Terminology and Technology", Mobile Computing Deployment and Management, XP055380318, Apr. 16, 2014, pp. 224-225.

(Continued)

*Primary Examiner* — Ajit Patel
(74) *Attorney, Agent, or Firm* — Slater Matsil, LLP (57) ABSTRACT

A wireless local area network scanning method and a wireless access point are provided. The method includes receiving, by a first wireless access point, a probe request frame broadcast by a station and obtaining, by the first wireless access point according to the probe request frame, an SSID associated with the station. Additionally, the method includes rejecting, by the first wireless access point, to reply to the station with a probe response frame corresponding to an SSID different from the SSID associated with the station, or if a preset condition is met, rejecting, by the first wireless access point, to reply to the station with a probe response frame corresponding to an SSID different from the SSID associated with the station.

20 Claims, 5 Drawing Sheets

(56) References Cited

U.S. PATENT DOCUMENTS

| | | | |
|---|---|---|---|
| 2007/0081477 A1 | 4/2007 | Jakkahalli et al. | |
| 2008/0298333 A1* | 12/2008 | Seok .................... | H04W 8/005 370/338 |
| 2013/0188628 A1 | 7/2013 | Lee et al. | |
| 2013/0235859 A1* | 9/2013 | Sun ...................... | H04W 48/08 370/338 |
| 2014/0355589 A1* | 12/2014 | Yang .................... | H04W 48/14 370/338 |
| 2015/0222447 A1* | 8/2015 | Park .................... | H04L 5/0044 370/312 |
| 2015/0327158 A1 | 11/2015 | Wentink | |
| 2016/0255661 A1* | 9/2016 | Siraj .................... | H04W 76/10 370/338 |
| 2017/0171809 A1* | 6/2017 | Crowe ................. | H04W 48/16 |

OTHER PUBLICATIONS

David D. Coleman et al., "Chapter 3: 802.11 MAC Sublayer Frame Format", CWAP Certified Wireless Analysis Professional Official Study Guide, XP055379835, Mar. 21, 2011, 1 page.

* cited by examiner

| Station MAC address | SSID |
|---|---|
| 80FB-0601-5555 | Ross |
| 80FB-0601-6666 | Gloria |
| 80FB-0601-7777 | Ross |
| 80FB-0601-8888 | Linda |

WIRELESS LOCAL AREA NETWORK SCANNING METHOD AND WIRELESS ACCESS POINT

CROSS-REFERENCE TO RELATED APPLICATIONS

This application claims priority to Chinese Patent Application No. 201610154723.6, filed on Mar. 17, 2016, which is hereby incorporated by reference in its entirety.

TECHNICAL FIELD

This application relates to the field of wireless communications technologies, and in particular, to a wireless local area network scanning method and a wireless access point.

BACKGROUND

Figure 1:
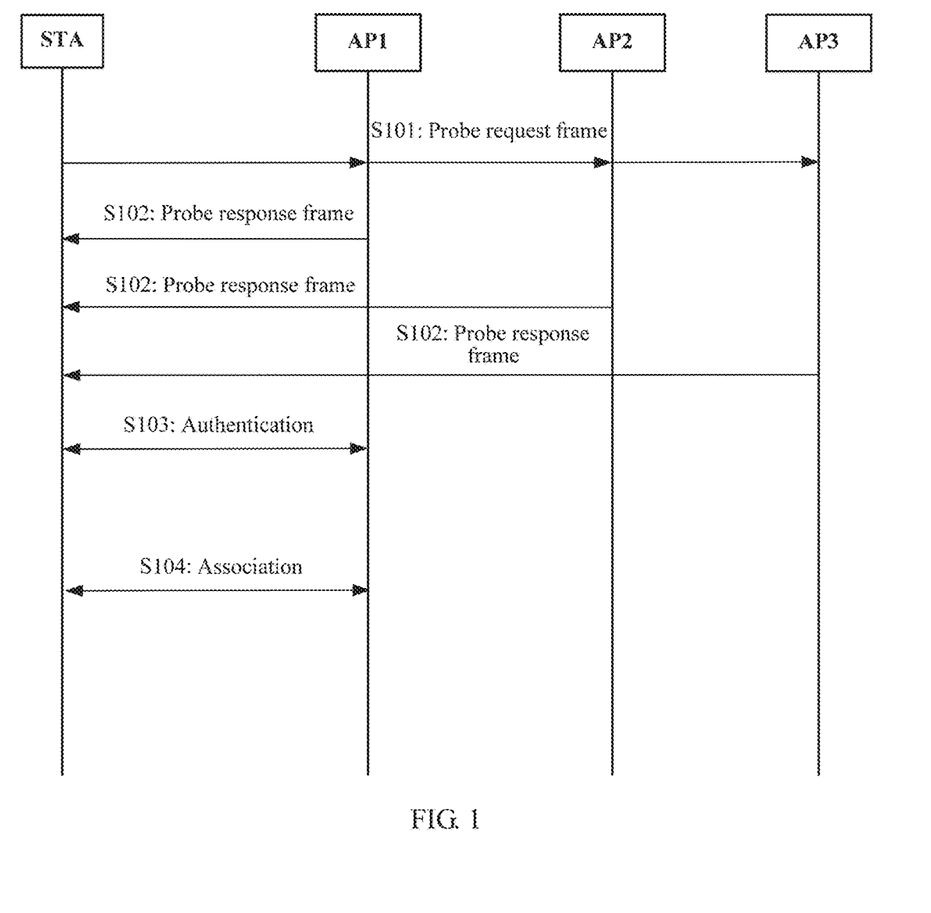
FIG. 1 is a schematic flowchart of detecting a wireless AP by a STA in an active scanning manner.

In a wireless local area network (WLAN), a station (STA) finds a wireless access point (AP) by using an Active Scanning mode or a Passive Scanning mode. In the active scanning mode, the STA sends a probe request frame to detect a wireless AP existent nearby. In the case of passive scanning, the STA listens to a beacon frame sent by a wireless AP to obtain information about a surrounding network. A process of detecting a wireless AP by a STA in an active scanning mode is shown in FIG. 1, and includes the following steps.

S101. The STA sends a probe request frame. The STA may broadcast or unicast the probe request frame. If the STA broadcasts the probe request frame, a receiver address (RA) in the probe request frame is a broadcast address, a basic service set identifier (BSSID) in the probe request frame is a wildcard BSSID, and a service set identifier (SSID) in the probe request frame is a wildcard SSID.

S102. An AP1, an AP2, and an AP3 that receive the probe request frame sent by the STA respond with corresponding probe response frames.

After receiving the probe response frames sent by the AP1, the AP2, and the AP3, the STA selects the AP1. The STA may select a wireless AP according to signal strength.

S103. Optionally, if authentication is required, authentication may be performed on the STA. If the authentication succeeds, the following process continues.

S104. The STA associates with the AP1.

In this way, the STA may start to transmit a data frame to the AP1. After associating with the AP1, the STA may further perform active scanning, that is, broadcasting a probe request frame, to collect information about a surrounding network. For example, when the STA needs to roam, the STA broadcasts a probe request frame, and the AP2 and the AP3 that receive the probe request frame respond with probe response frames. The probe response frame is a management frame and is generally sent at a minimum rate to ensure its reliability. Therefore, the probe response frame occupies a wireless medium for a long time.

When there are a large quantity of wireless APs in the WLAN, all wireless APs respond to a received probe request frame. Consequently, a large quantity of wireless medium resources is occupied.

SUMMARY

This application provides a wireless local area network scanning method and a wireless access point to reduce wireless medium occupation of probe response frames.

According to a first aspect, a wireless local area network scanning method is provided, and the method includes receiving, by a first wireless access point, a probe request frame sent by a station, where a receiver address in the probe request frame is a broadcast address, a basic service set identifier (BSSID) in the probe request frame is a wildcard BSSID, and a service set identifier (SSID) in the probe request frame is a wildcard SSID. The method also includes obtaining, by the first wireless access point according to the probe request frame, an SSID associated with the station. Additionally, the method includes rejecting, by the first wireless access point, to reply to the station with a probe response frame corresponding to an SSID different from the SSID associated with the station, or if a preset condition is met, rejecting, by the first wireless access point, to reply to the station with a probe response frame corresponding to an SSID different from the SSID associated with the station.

According to the method described in the first aspect, when receiving a probe request frame sent by a station and obtaining an SSID associated with the station, a first wireless access point rejects to reply to the station with a probe response frame corresponding to an SSID different from the SSID associated with the station, rather than gives probe responses to all received probe request frames without discretion. This avoids existence of a large quantity of probe response frames in a channel and reduces wireless medium occupation of probe response frames.

With reference to the first aspect, in a first implementation manner of the first aspect, a transmitter address of the probe request frame is a medium access control (MAC) address of the station, and the obtaining, by the first wireless access point according to the probe request frame, an SSID associated with the station includes: obtaining, by the first wireless access point according to the MAC address of the station, the SSID associated with the station from a pre-recorded mapping between a station MAC address set and an SSID set, where the station MAC address set includes a MAC address of at least one station, and the SSID set includes at least one SSID associated with the at least one station.

With the foregoing step executed, the SSID associated with the station can be obtained from the pre-recorded mapping.

Herein, the mapping may be stored in a form of an association information list in the first wireless access point. Each wireless access point independently generates an association information list of a station associated with the wireless access point itself, and sends the association information list generated by itself to another wireless access point for association information list synchronization.

With reference to the first implementation manner of the first aspect, in a second implementation manner of the first aspect, the method further includes: updating, by the first wireless access point when the SSID associated with the station changes, an SSID that is corresponding to the MAC address of the station and that is recorded in the mapping.

With the foregoing step executed, accuracy of the SSID obtained from the mapping can be improved.

With reference to the first aspect or either of the implementation manners of the first aspect, in a third implementation manner of the first aspect, the preset condition includes one or more of the following: that a cumulative quantity of received probe request frames sent by the station does not reach a preset quantity threshold; or that cumulative duration is less than a preset duration threshold. Whether to reject to reply with a probe response frame is determined by means of counting or timing.

With reference to the first aspect or any one of the implementation manners of the first aspect, in a fourth implementation manner of the first aspect, the station is associated with a second wireless access point, and the SSID associated with the station is an SSID of the second wireless access point, or the SSID associated with the station is one of multiple SSIDs of the second wireless access point.

With reference to the first aspect or any one of the implementation manners of the first aspect, in a fifth implementation manner of the first aspect, after the first wireless access point rejects to reply to the station with a probe response frame corresponding to an SSID different from the SSID associated with the station, the method further includes: receiving, by the first wireless access point, the probe request frame sent by the station, where the SSID associated with the station does not change; and if the preset condition is not met, replying, by the first wireless access point, to the station with a probe response frame corresponding to an SSID that is of the first wireless access point and that is different from the SSID associated with the station.

By executing the foregoing steps, if the first wireless access point receives the probe request frame sent by the station and the preset condition is not met, the first wireless access point replies to the station with a probe response frame, to ensure that the station can learn network information of the first wireless access point.

With reference to the fifth implementation manner of the first aspect, in a sixth implementation manner of the first aspect, after the first wireless access point replies to the station with a probe response frame corresponding to an SSID that is of the first wireless access point and that is different from the SSID associated with the station, the method further includes: resetting a cumulative quantity of received probe request frames that are sent by the station or restarting timing.

With the foregoing step executed, a probe response frame corresponding to an SSID different from the SSID associated with the station can be selectively returned to the station, rather than that a reply is given to every probe request frame. This avoids existence of a large quantity of probe response frames in a channel and reduces wireless medium occupation of probe response frames.

With reference to the first aspect or any one of the implementation manners of the first aspect, in a seventh implementation manner of the first aspect, the method further includes: replying, by the first wireless access point, to the station with a probe response frame corresponding to an SSID that is of the first wireless access point and that is the same as the SSID associated with the station.

According to a second aspect, a wireless access point is provided, where the wireless access point is a first wireless access point, the first wireless access point includes a processor and a radio frequency module, and the processor is configured to receive, by using the radio frequency module, a probe request frame sent by a station, where a receiver address in the probe request frame is a broadcast address, a BSSID in the probe request frame is a wildcard BSSID, and an SSID in the probe request frame is a wildcard SSID and obtain, according to the probe request frame, an SSID associated with the station. The processor is also configured to reject to reply to the station with a probe response frame corresponding to an SSID different from the SSID associated with the station, or if a preset condition is met, reject to reply to the station with a probe response frame corresponding to an SSID different from the SSID associated with the station.

By executing the foregoing operations, when receiving a probe request frame sent by a station and obtaining an SSID associated with the station, a first wireless access point rejects to reply to the station with a probe response frame corresponding to an SSID different from the SSID associated with the station, rather than gives probe responses to all received probe request frames without discretion. This avoids existence of a large quantity of probe response frames in a channel and reduces wireless medium occupation of probe response frames.

With reference to the second aspect, in a first implementation manner of the second aspect, a transmitter address of the probe request frame is a MAC address of the station, and the obtaining, by the processor according to the probe request frame, an SSID associated with the station includes: obtain, according to the MAC address of the station, the SSID associated with the station from a pre-recorded mapping between a station MAC address set and an SSID set, where the station MAC address set includes a MAC address of at least one station, and the SSID set includes at least one SSID associated with the at least one station.

With the foregoing operation executed, the SSID associated with the station can be obtained from the pre-recorded mapping.

Herein, the mapping may be stored in a form of an association information list in the first wireless access point. Each wireless access point independently generates an association information list of a station associated with the wireless access point itself, and sends the association information list generated by itself to another wireless access point for association information list synchronization.

With reference to the first implementation manner of the second aspect, in a second implementation manner of the second aspect, the processor is further configured to: update, by the first wireless access point when the SSID associated with the station changes, an SSID that is corresponding to the MAC address of the station and that is recorded in the mapping.

With the foregoing operation executed, accuracy of the SSID obtained from the mapping can be improved.

With reference to the second aspect or either of the implementation manners of the second aspect, in a third implementation manner of the second aspect, the preset condition includes one or more of the following: that a cumulative quantity of received probe request frames sent by the station does not reach a preset quantity threshold; or that cumulative duration is less than a preset duration threshold. Whether to reject to reply with a probe response frame is determined by means of counting or timing.

With reference to the second aspect or any one of the implementation manners of the second aspect, in a fourth implementation manner of the second aspect, the station is associated with a second wireless access point, and the SSID associated with the station is an SSID of the second wireless access point, or the SSID associated with the station is one of multiple SSIDs of the second wireless access point.

With reference to the second aspect or any one of the implementation manners of the second aspect, in a fifth implementation manner of the second aspect, after the processor rejects to reply to the station with a probe response frame corresponding to an SSID different from the SSID associated with the station, the processor is further configured to: receive, by using the radio frequency module, the probe request frame sent by the station, where the SSID associated with the station does not change; and if the preset condition is not met, reply, by using the radio frequency module, to the station with a probe response frame corresponding to an SSID that is of the first wireless access point and that is different from the SSID associated with the station.

By executing the foregoing operations, if the first wireless access point receives the probe request frame sent by the station and the preset condition is not met, the first wireless access point replies to the station with a probe response frame, to ensure that the station can learn network information of the first wireless access point.

With reference to the fifth implementation manner of the second aspect, in a sixth implementation manner of the second aspect, after the processor replies, by using the radio frequency module, to the station with a probe response frame corresponding to an SSID that is of the first wireless access point and that is different from the SSID associated with the station, the processor is further configured to: reset a cumulative quantity of received probe request frames that are sent by the station or restarting timing.

With the foregoing operation executed, a probe response frame corresponding to an SSID different from the SSID associated with the station can be selectively returned to the station, rather than that a reply is given to every probe request frame. This avoids existence of a large quantity of probe response frames in a channel and reduces wireless medium occupation of probe response frames.

With reference to the second aspect or any one of the implementation manners of the second aspect, in a seventh implementation manner of the second aspect, the processor is further configured to: reply, by using the radio frequency module, to the station with a probe response frame corresponding to an SSID that is of the first wireless access point and that is the same as the SSID associated with the station.

According to a third aspect, a wireless access point is provided, where the wireless access point is a first wireless access point, and the first wireless access point includes a module or a unit configured to execute the wireless local area network scanning method described in the foregoing first aspect or any one of the implementation manners of the first aspect.

According to a fourth aspect, a wireless local area network system is provided, where the system includes a wireless access point and a wireless controller, the wireless access point is the first wireless access point according to the second aspect or the third aspect, and the wireless controller is configured to store the mapping between a station MAC address set and an SSID set.

Herein, the wireless controller includes a switch, a router, or a server.

These aspects of this application are more readily understood in the following description of embodiments.

BRIEF DESCRIPTION OF THE DRAWINGS

To describe the technical solutions in the embodiments of the present invention or in the conventional art more clearly, the following briefly describes the accompanying drawings required for describing the embodiments.

DETAILED DESCRIPTION OF ILLUSTRATIVE EMBODIMENTS

The following clearly describes the technical solutions in the embodiments of the present invention with reference to the accompanying drawings in the embodiments of the present invention.

A wireless access point described in the following embodiments may be a fat access point (AP) (which can work independently, and which can complete configuration of an antenna, a mode, authentication, encryption, data forwarding, management, and a policy by itself), or may be a thin AP (which cannot work independently but needs to be connected to a wireless controller, and which can complete configuration of an antenna, a mode, and encryption by itself, but requires help of the wireless controller to implement configuration of authentication, data forwarding, management, and a policy). The wireless controller may be a switch, a router, a server, or the like.

Figure 2:
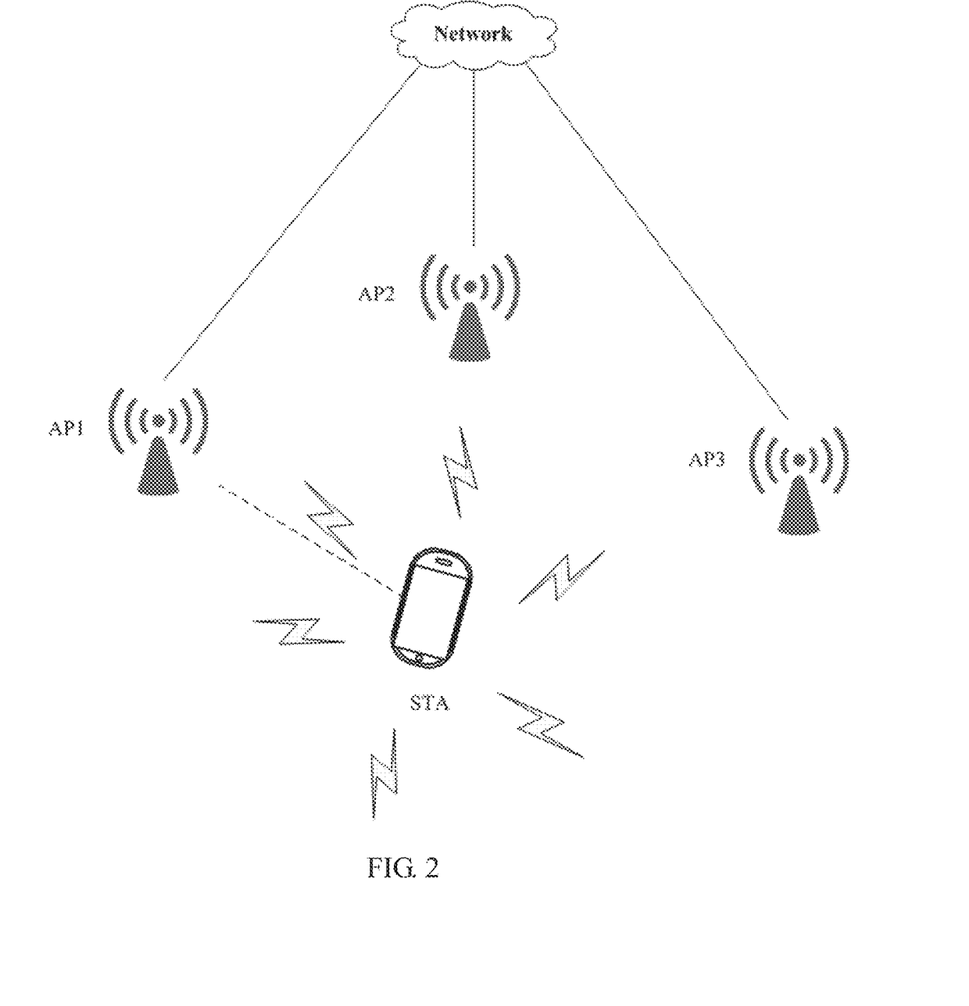
FIG. 2 is a schematic diagram of a wireless local area network system to which an embodiment of the present invention may be applied.

Referring to FIG. 2, FIG. 2 is a schematic diagram of a wireless local area network system according to an embodiment of the present invention. The wireless local area network system includes multiple wireless access points (for example, an AP1, an AP2, and an AP3) and a non-AP station (non-AP STA) (for example, a STA in the figure). The AP1, the AP2, and the AP3 may be separately connected to a network (for example, an intranet or the Internet). The STA has been associated with the AP1. After being associated, the STA may still send a broadcast probe request frame to detect information about a surrounding network. A first wireless access point described in this embodiment of the present invention may be any wireless access point in the wireless local area network system. Although there are three wireless access points and one station described in FIG. 2, the wireless local area network system may include another quantity of wireless access points and another quantity of non-AP stations. The STA may be a personal computer (PC), a mobile phone, a personal digital assistant (PDA), or another wireless local area network (WLAN) device. The following embodiments are described by using an example in which an AP2 is a first wireless access point, an AP1 is a second wireless access point, and a STA is a station.

Figure 3:
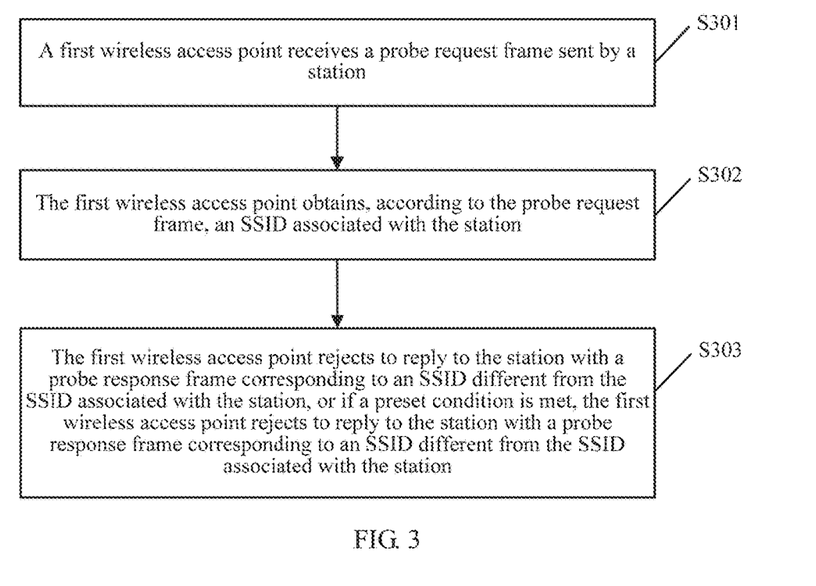
FIG. 3 is a schematic flowchart of a wireless local area network scanning method according to an embodiment of the present invention.

Referring to FIG. 3, FIG. 3 is a schematic flowchart of a wireless local area network scanning method according to an embodiment of the present invention. The wireless local area network scanning method includes but is not limited to the following steps.

S301. A first wireless access point receives a probe request frame sent by a station.

The station has been associated with a second wireless access point. The first wireless access point may or may not be the same as the second wireless access point.

Figure 4:
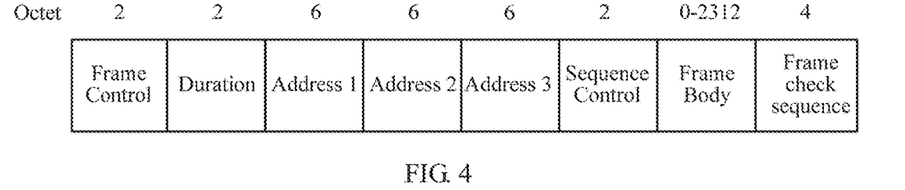
FIG. 4 is a schematic diagram of a format of a probe request frame involved in an embodiment of the present invention.

For a frame format of the probe request frame, refer to FIG. 4. As shown in FIG. 4, the probe request frame includes a media access control (MAC) header, a frame body, and a frame check sequence (FCS). The MAC header includes a Frame Control field, a Duration field, an Address 1 field, an Address 2 field, an Address 3 field, and a Sequence Control field. The address 1 field of the probe request frame is a receiver address, the Address 2 field of the probe request frame is a transmitter address (TA), and the Address 3 field of the probe request frame is a basic service set identifier (BSSID) field. The station sends the probe request frame in a broadcast manner. That is, the station sets the receiver address (RA) in the Address 1 field to a broadcast address (for example, all is), the TA in the Address 2 field to a MAC address of the station, and a value in the BSSID field to a wildcard BSSID (for example, all is). The frame body of the probe request frame includes an SSID element. The SSID element includes an Element ID field, a Length field, and an SSID field. The Element ID field is written with a value denoting the SSID element, and the length field is written with a length of the SSID field. The SSID field is written with an SSID. The SSID is used to indicate an identity of an extended service set (ESS) or an independent basic service set (IBSS). The length of the SSID field is between 0 and 32 octets. The station sets the length of the SSID field in the probe request frame to 0 to indicate that the SSID is a wildcard SSID.

S302. The first wireless access point obtains, according to the probe request frame, an SSID associated with the station.

The station is associated with the second wireless access point. The second wireless access point may have only one SSID or multiple SSIDs. A wireless access point may generate multiple virtual wireless access points (VWAP). Each VWAP has its own BSSID identifier, and SSIDs of all VWAPs may be the same or may be different. If the second wireless access point has only one SSID, the SSID associated with the station is the SSID of the second wireless access point. If the second wireless access point includes multiple SSIDs, the SSID associated with the station is an SSID of a VWAP associated with the station.

The first wireless access point may obtain the SSID associated with the station from a pre-recorded mapping between a station MAC address set and an SSID set according to the MAC address of the station carried in the probe request frame. The station MAC address set includes a MAC address of at least one station, and the SSID set includes at least one SSID associated with the at least one station. If the MAC address of the station exists in the mapping, it is indicated that the station has been associated with a wireless access point.

The mapping may be stored in a form of an association information list in the first wireless access point. Each wireless access point may generate an association information list of a station associated with the wireless access point itself, and send the association information list generated by itself to another wireless access point to achieve association information list synchronization. To save system resources, after generating the association information list of the station associated with the wireless access point itself, each wireless access point may send the association information list only to one or more wireless access points adjacent to the wireless access point geographically, or only to a wireless access point that belongs to a same wireless controller as the wireless access point, rather than to all wireless access points. For example, after being associated with a STA, an AP1 generates its own association information list 1. A mapping between a MAC address of the STA and an SSID associated with the STA is recorded in the association information list 1. A neighbor list is stored in the AP1, and the neighbor list includes MAC addresses of an AP2 and an AP3. The AP1 separately sends the association information list 1 to the AP2 and the AP3 in a direct communication manner according to the MAC addresses of the AP2 and the AP3. After receiving the association information list 1, the AP2 and the AP3 update their own association information lists. Alternatively, the AP1 sends a broadcast probe request frame, and all wireless access points that receive the probe request frame respond with a probe response frame. The AP1 selects, according to signal strength of each reply signal, the AP2 and the AP3 that have the greatest signal strength as neighbor APs, and sends the association information list 1 only to the AP2 and the AP3. Alternatively, the AP1, the AP2, and the AP3 are all thin APs and are controlled by a same wireless controller. The AP1 may send the association information list 1 to the wireless controller, and the wireless controller forwards the association information list 1 to the AP2 and the AP3.

Therefore, after receiving an association information list sent by one or more adjacent wireless access points, the first wireless access point updates an association information list generated by itself according to the received association information list. An association information list obtained thereafter records a mapping between a MAC address set of a station associated with an adjacent wireless access point and an SSID set. When the first wireless access point obtains the MAC address of the station from the probe request frame, the first wireless access point queries the association information list recorded by itself, and obtains the SSID associated with the station from the association information list recorded by itself.

When the SSID associated with the station changes, the first wireless access point updates the SSID corresponding to the station recorded in the association information list. For example, when the STA is disassociated from the AP1 and is re-associated with the AP3, both the AP1 and the AP3 have only one SSID, and their SSIDs are different, the AP3 modifies its own association information list by modifying an SSID corresponding to the MAC address of the STA in the association information list to the SSID of the AP3, and sends its own association information list to the AP1 and the AP2. The AP1 and the AP2 update their own recorded association information lists according to the association information list of the AP3.

If the first wireless access point is a thin AP, the mapping may alternatively be stored in a form of an association information list in a wireless controller to which the first wireless access point belongs. The association information list records association information of a wireless access point belonging to the wireless controller, and the association information includes a mapping between a station MAC address set and an SSID set. For example, the AP1, the AP2, and the AP3 are all thin APs and are controlled by an AC1. When the STA is successfully associated with the AP1, the AC1 records the MAC address of the STA and an SSID of the AP1 in an association information list. When the STA is disassociated from the AP1 and is re-associated with the AP3, if both the AP1 and the AP3 have only one SSID, and their SSIDs are different, the AC1 updates the association information list, and modifies an SSID corresponding to the MAC address of the STA in the association information list to the SSID of the AP3.

Therefore, when the first wireless access point obtains the MAC address of the station from the probe request frame, the first wireless access point sends a query request to the wireless controller. The query request carries the MAC address of the station. The wireless controller receives the query request, obtains, according to the MAC address of the station, the SSID associated with the station from the association information list recorded by itself, and sends the obtained SSID to the first wireless access point.

Figure 5:
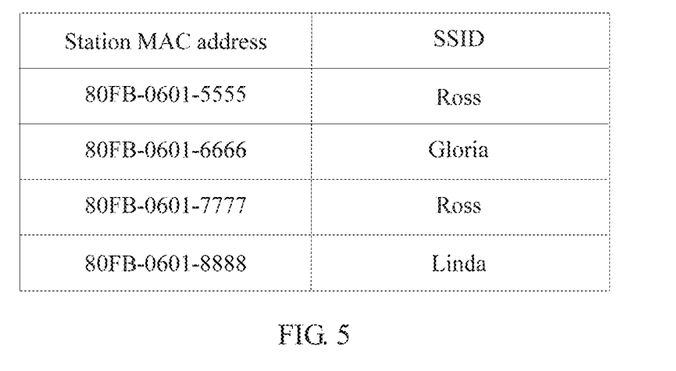
FIG. 5 is a schematic diagram of an association information list according to an embodiment of the present invention.

For example, the association information list may be in a structure shown in FIG. 5.

It can be known from FIG. 5 that an SSID associated with a station whose MAC address is 80FB-0601-5555 is Ross, an SSID associated with a station whose MAC address is 80FB-0601-6666 is Gloria, an SSID associated with a station whose MAC address is 80FB-0601-7777 is Ross, and an SSID associated with a station whose MAC address is 80FB-0601-8888 is Linda. It can be seen that different stations may associate with a same SSID, and a same MAC address can correspond only to one SSID. If the MAC address of the STA is 80FB-0601-5555, after receiving the probe request frame sent by the STA, the AP2 quires an association information list shown in FIG. 5 and determines that the MAC address of the STA exists. Therefore, it can be determined that the MAC address of the STA has been associated with a wireless access point, and that an SSID associated with the MAC address of the STA is Ross.

S303. The first wireless access point rejects to reply to the station with a probe response frame corresponding to an SSID different from the SSID associated with the station, or if a preset condition is met, the first wireless access point rejects to reply to the station with a probe response frame corresponding to an SSID different from the SSID associated with the station.

The first wireless access point rejects to reply to the station with a probe response frame corresponding to an SSID different from the SSID associated with the station. This can reduce a quantity of probe response frames returned and reduce wireless medium occupation of probe response frames. The preset condition includes one or more of the following: that a cumulative quantity of received probe request frames sent by the station does not reach a preset quantity threshold; or that cumulative duration is less than a preset duration threshold. The preset quantity threshold and the preset duration threshold may be set by a system of the first wireless access point by default or may be manually set by a user, which is not specifically limited in this embodiment of the present invention.

The first wireless access point replies to the station with a probe response frame corresponding to a same SSID as the SSID associated with the station. For example, when the station is in a process of moving from a coverage area of the second wireless access point to a coverage area of the first wireless access point, that is, the station is in a roaming process, and an SSID of the first wireless access point is the same as the SSID associated with the station, the first wireless access point replies to the station with a probe response frame to allow roaming access of the station.

The first wireless access point may have only one SSID or multiple SSIDs. If the first wireless access point has only one SSID, only this SSID needs to be compared with the SSID associated with the station. If the two SSIDs are different, the first wireless access point rejects to reply to the station with a probe response frame. If the two SSIDs are the same, the first wireless access point replies with a probe response frame. If the first wireless access point includes multiple SSIDs, and each SSID corresponds to one VWAP of the first wireless access point, the first wireless access point needs to determine whether an SSID that is different from the SSID associated with the station exists among the SSIDs of its own multiple VWAPs. If an SSID that is different from the SSID associated with the station exists among the SSIDs of its own multiple VWAPs, the first wireless access point rejects to reply to the station with a probe response frame corresponding to a VWAP whose SSID is different from the SSID associated with the station, but replies to the station with only a probe response frame corresponding to a VWAP that is the same as the SSID associated with the station. Alternatively, if the first wireless access point includes multiple SSIDs, when the preset condition is met, the first wireless access point determines whether an SSID that is different from the SSID associated with the station exists among the SSIDs of its own multiple VWAPs. If an SSID that is different from the SSID associated with the station exists among the SSIDs of its own multiple VWAP, the first wireless access point rejects to reply to the station with a probe response frame corresponding to a VWAP whose SSID is different from the SSID associated with the station, but replies to the station with only a probe response frame corresponding to a VWAP that is the same as the SSID associated with the station.

For example, the preset quantity threshold is 5. If the SSID associated with the STA is Ross, and the AP2 has only one SSID that is Linda, after receiving the probe request frame sent by the STA, the AP2 determines that Linda is different from Ross and does not reply with a probe response frame. Alternatively, the AP2 does not reply with a probe response frame when receiving first four probe request frames sent by the STA, and separately replies with a probe response frame when receiving a $5^{th}$ or an $N^{th}$ (N is a positive integer and N>5) probe request frame sent by the STA. If the SSID associated with the STA is Ross, the AP2 has four VWAPs that are respectively a VWAP1, a VWAP2, a VWAP3, and a VWAP4, and SSIDs of the VWAPs are respectively Ross, Linda, Aaron, and Dave, when the AP2 receives the probe request frame sent by the STA, only the SSID of the VWAP1 is the same as Ross. Therefore, the AP2 needs to reply with only a probe response frame corresponding to the VWAP1 and rejects to reply with probe response frames corresponding to the VWAP2 to the VWAP4. Alternatively, the AP2 replies with only one probe response frame corresponding to the VWAP1 when receiving each of first four probe request frames sent by the STA, and replies with probe response frames that correspond to the four VWAPs respectively when receiving a $5^{th}$ or an $N^{th}$ (N is a positive integer and N>5) probe request frame sent by the STA.

If a cumulative quantity of received probe request frames that are sent by the station reaches the preset quantity threshold, the first wireless access point replies to the station with a probe response frame corresponding to an SSID that is of the first wireless access point and that is different from the SSID associated with the station, and resets the cumulative quantity of received probe request frames that are sent by the station. Alternatively, if cumulative duration is greater than or equal to the preset duration threshold, the first wireless access point replies to the station with a probe response frame corresponding to an SSID that is of the first wireless access point and that is different from the SSID associated with the station, and restarts timing. The first wireless access point periodically replies to the station with a probe response frame rather than replies to every probe request frame. This reduces a quantity of probe response frames returned and reduces wireless medium occupation of probe response frames. For example, the SSID associated with the STA is Ross, and SSIDs of four VWAPs of the AP2 that are a VWAP1, a VWAP2, a VWAP3, and a VWAP4 are respectively Ross, Linda, Aaron, and Dave. In this case, after receiving each five probe request frames sent by the STA, the AP2 replies to the STA with probe response frames corresponding to the VWAP2 to the VWAP4 for once, and resets the cumulative quantity to restart counting. Alternatively, the STA replies to the station with probe response frames corresponding to the VWAP2 to the VWAP4 for once, only when duration that is greater than or equal to 10 minutes has passed since a previous reply with a probe response frame.

By executing the foregoing steps, when receiving a probe request frame sent by a station and obtaining an SSID associated with the station, a first wireless access point rejects to reply to the station with a probe response frame corresponding to an SSID different from the SSID associated with the station, rather than gives probe responses to all received probe request frames without discretion. This avoids existence of a large quantity of probe response frames in a channel and reduces wireless medium occupation of probe response frames.

To better implement the foregoing wireless local area network scanning method in the embodiments of the present invention, the embodiments also provide a wireless access point for implementing the foregoing method.

Figure 6:
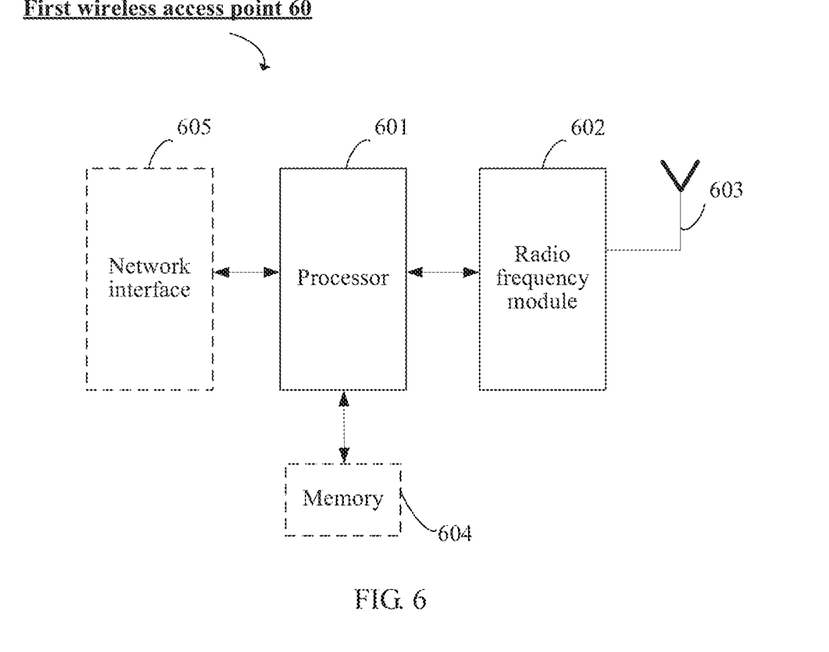
FIG. 6 is a schematic structural diagram of a wireless access point according to an embodiment of the present invention.

Referring to FIG. 6, FIG. 6 is a schematic structural diagram of a wireless access point according to an embodiment of the present invention. The wireless access point is a first wireless access point 60. The first wireless access point 60 in this embodiment may include at least one processor 601, at least one radio frequency module 602, and at least one antenna 603. The processor 601 and the radio frequency module 602 may be connected by using a bus or in another manner. The antenna 603 is configured to transmit or receive an electromagnetic wave. Although not shown in FIG. 6, the radio frequency module 602 may have a transceiver (including a modem). The transceiver is configured to convert an electromagnetic wave received by the antenna 603 into a current and into digital data eventually, and conversely convert digital data into a current and then into an electromagnetic wave for the antenna 603 to radiate into free space. The radio frequency module 602 may also have a receive amplifier and a transmit amplifier, which may be configured to amplify a signal for transmission.

The bus may be an industry standard architecture (ISA) bus, a peripheral component interconnect (PCI) bus, an extended industry standard architecture (EISA) bus, and the like. The bus can be classified into an address bus, a data bus, a control bus, and the like.

The processor 601 may be a general purpose processor, such as a central processing unit (CPU). The processor 601 may also include a hardware chip, and the hardware chip may be one or a combination of the following: an application-specific integrated circuit (ASIC), a field programmable gate array (FPGA), and a complex programmable logic device (CPLD). The processor 601 may process data that is received by using the radio frequency module 602. The processor 601 may also process data that is to be sent to the radio frequency module 602 for transmission through the antenna 603.

If the processor 601 is a CPU or a combination that includes a CPU, the first wireless access point 60 further includes a memory 604, configured to store program code and send the program code to the CPU. The memory 604 may also be configured to store the association information list described in the foregoing embodiment. The memory 604 may include a volatile memory, such as a random access memory (RAM); or the memory may include a non-volatile memory, such as a read-only memory (ROM), a flash memory, a hard disk drive (HDD), or a solid-state drive (SSD); or the memory 604 may include a combination of the foregoing types of memories. The memory 604 is connected to the processor 601 by using the bus.

The first wireless access point 60 may also include a network interface 605. The network interface 605 may be a wired interface (for example, an Ethernet interface) or a wireless interface (for example, a cellular network interface or a WLAN interface using another radio frequency module). The first wireless access point 60 communicates with a network by using the network interface 605, and the network may be an intranet, the Internet, or the like.

The processor 601 is configured to call wireless local area network scanning program code stored in the memory 604 to execute the following operations: receiving, by the processor 601 by using the radio frequency module 602, a probe request frame sent by a station, where a receiver address in the probe request frame is a broadcast address, a BSSID in the probe request frame is a wildcard BSSID, and an SSID in the probe request frame is a wildcard SSID; obtaining, by the processor 601 according to the probe request frame, an SSID associated with the station; and rejecting, by the processor, to reply to the station with a probe response frame corresponding to an SSID different from the SSID associated with the station, or if a preset condition is met, rejecting, by the processor, to reply to the station with a probe response frame corresponding to an SSID different from the SSID associated with the station.

By executing the foregoing operations, when receiving a probe request frame sent by a station and obtaining an SSID associated with the station, the first wireless access point 60 rejects to reply to the station with a probe response frame corresponding to an SSID different from the SSID associated with the station, rather than gives probe responses to all received probe request frames without discretion. This avoids existence of a large quantity of probe response frames in a channel and reduces wireless medium occupation of probe response frames.

A transmitter address of the probe request frame is a MAC address of the station. The obtaining, by the processor 601 according to the probe request frame, an SSID associated with the station includes: obtaining, by the processor 601 according to the MAC address of the station, the SSID associated with the station from a pre-recorded mapping between a station MAC address set and an SSID set, where the station MAC address set includes a MAC address of at least one station, and the SSID set includes at least one SSID associated with the at least one station.

With the foregoing operation executed, the SSID associated with the station can be obtained from the pre-recorded mapping.

Herein, the mapping may be stored in a form of an association information list in the first wireless access point 60. Each wireless access point independently generates an association information list of a station associated with the wireless access point itself, and sends the association information list generated by itself to another wireless access point for association information list synchronization.

The processor 601 is further configured to: update, by the processor 601 when the SSID associated with the station changes, an SSID that is corresponding to the MAC address of the station and that is recorded in the mapping.

With the foregoing operation executed, accuracy of the SSID obtained from the mapping can be improved.

The preset condition includes one or more of the following: that a cumulative quantity of received probe request frames sent by the station does not reach a preset quantity threshold; or that cumulative duration is less than a preset duration threshold. Whether to reject to reply with a probe response frame is determined by means of counting or timing.

The station is associated with a second wireless access point, and the SSID associated with the station is an SSID of the second wireless access point, or the SSID associated with the station is one of multiple SSIDs of the second wireless access point.

After the processor 601 rejects to reply to the station with a probe response frame corresponding to an SSID different from the SSID associated with the station, the processor 601 is further configured to: receive, by the processor 601 by using the radio frequency module 602, the probe request frame sent by the station, where the SSID associated with the station does not change; and if the preset condition is not met, reply, by the processor 601 by using the radio frequency module 602, to the station with a probe response frame corresponding to an SSID that is of the first wireless access point 60 and that is different from the SSID associated with the station.

By executing the foregoing operations, if the first wireless access point 60 receives the probe request frame sent by the station and the preset condition is not met, the first wireless access point 60 replies to the station with a probe response frame, to ensure that the station can learn network information of the first wireless access point 60.

After the processor 601 replies, by using the radio frequency module 602, to the station with a probe response frame corresponding to an SSID that is of the first wireless access point 60 and that is different from the SSID associated with the station, the processor 601 is further configured to: reset a cumulative quantity of received probe request frames that are sent by the station or restarting timing.

With the foregoing operation executed, a probe response frame corresponding to an SSID different from the SSID associated with the station can be selectively returned to the station, rather than that a reply is given to every probe request frame. This avoids existence of a large quantity of probe response frames in a channel and reduces wireless medium occupation of probe response frames.

The processor 601 is further configured to: reply, by the processor 601 by using the radio frequency module 602, to the station with a probe response frame corresponding to an SSID that is of the first wireless access point 60 and that is the same as the SSID associated with the station.

Functions of the functional modules in the first wireless access point 60 described in the foregoing embodiment may be specifically implemented according to the method in the foregoing method embodiment shown in FIG. 3, and details are not described herein again.

Figure 7:
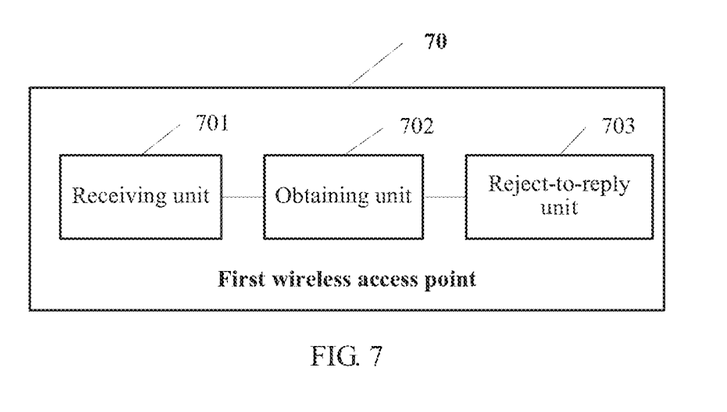
FIG. 7 is a schematic structural diagram of another wireless access point according to an embodiment of the present invention.

Referring to FIG. 7, FIG. 7 is a schematic structural diagram of another wireless access point according to an embodiment of the present invention. The wireless access point is a first wireless access point 70. As shown in FIG. 7, the first wireless access point 70 may include a receiving unit 701, an obtaining unit 702, and a reject-to-reply unit 703.

The receiving unit 701 is configured to receive a probe request frame sent by a station, where a receiver address in the probe request frame is a broadcast address, a BSSID in the probe request frame is a wildcard BSSID, and an SSID in the probe request frame is a wildcard SSID.

The obtaining unit 702 is configured to obtain, according to the probe request frame, an SSID associated with the station.

The reject-to-reply unit 703 is configured to reject to reply to the station with a probe response frame corresponding to an SSID different from the SSID associated with the station, or if a preset condition is met, reject to reply to the station with a probe response frame corresponding to an SSID different from the SSID associated with the station.

In this embodiment, the first wireless access point 70 is presented in a form of functional units. The "unit" herein may refer to an ASIC circuit, a processor and a memory that execute one or more software or firmware programs, and/or another device that can provide the foregoing functions. The wireless access point 70 may be in the form shown in FIG. 6. For example, the receiving unit 701 may be implemented by the radio frequency module 602 in FIG. 6, and the obtaining unit 702 and the reject-to-reply unit 703 may be implemented by the processor 601 in FIG. 6.

A transmitter address of the probe request frame is a MAC address of the station. The obtaining unit 702 is specifically configured to: obtain, according to the MAC address of the station, the SSID associated with the station from a pre-recorded mapping between a station MAC address set and an SSID set, where the station MAC address set includes a MAC address of at least one station, and the SSID set includes at least one SSID associated with the at least one station.

Functions of functional units in the first wireless access point 70 described in the foregoing embodiment may be specifically implemented according to the method in the foregoing method embodiment shown in FIG. 3, and details are not described herein again.

In conclusion, when receiving a probe request frame sent by a station and obtaining an SSID associated with the station, a first wireless access point rejects to reply to the station with a probe response frame corresponding to an SSID different from the SSID associated with the station, rather than responds to all received probe request frames without discretion. This avoids existence of a large quantity of probe response frames in a channel and reduces wireless medium occupation of probe response frames.

A person of ordinary skill in the art may understand that all or some of the processes of the methods in the embodiments may be implemented by a computer program instructing relevant hardware. The program may be stored in a computer readable storage medium. When the program runs on a wireless access point, the processes of the methods in the embodiments are executed. The storage medium may be a magnetic disk, an optical disc, a ROM/RAM, and the like.

What are disclosed above are merely examples of embodiments of the present invention and should not be used to limit the scope of the claims of the present invention. Equivalent changes made according to the claims of the present invention shall still fall within the scope of the present invention.

What is claimed is:
1. A method, comprising:
   receiving, by a first wireless access point, a probe request frame sent by a station, wherein a transmitter address in the probe request frame is a medium access control (MAC) address of the station, a basic service set identifier (BSSID) in the probe request frame is a wildcard BSSID, and a service set identifier (SSID) in the probe request frame is a wildcard SSID;
   querying, by the first wireless access point according to the MAC address of the station, a mapping relationship between a MAC address set and an SSID set, to obtain the SSID associated with the station, wherein the SSID set comprises a plurality of SSIDs of the first wireless access point; and replying, by the first wireless access point, to the station with a first probe response frame corresponding to the SSID associated with the station, wherein the SSID associated with the station is the only SSID of the SSID set that corresponds to a probe response frame that is sent to the station in response to the probe request frame.

2. The method of claim 1, further comprising:
determining, by the first wireless access point in response to a preset condition being met, not to send, to the station in response to the probe request frame, any probe response frame that corresponds to any SSID of the SSID set other than the SSID associated with the station.

3. The method according to claim 2, wherein the preset condition comprises a cumulative quantity of received probe request frames sent by the station not reaching a preset quantity threshold.

4. The method according to claim 2, wherein the preset condition comprises a cumulative duration being less than a preset duration threshold.

5. The method according to claim 1, wherein the MAC address set comprises a MAC of a plurality of stations.

6. The method according to claim 1, wherein the station is associated with a second wireless access point, and wherein the SSID associated with the station is an SSID of the second wireless access point, or one of multiple SSIDs of the second wireless access point.

7. A wireless access point comprising:
a radio frequency module, configured to receive a probe request frame sent by a station, wherein a transmitter address of the probe request frame is a medium access control (MAC) address of the station, a basic service set identifier (BSSID) in the probe request frame is a wildcard BSSID, and a service set identifier (SSID) in the probe request frame is a wildcard SSID; and
a processor, configured to:
query, according to the MAC address of the station, a mapping relationship between a MAC address set and an SSID set, to obtain the SSID associated with the station, wherein the SSID set comprises a plurality of SSIDs of the wireless access point; and
reply to the station with a first probe response frame corresponding to the SSID associated with the station, wherein the SSID associated with the station is the only SSID of the SSID set that corresponds to a probe response frame that is sent to the station in response to the probe request frame.

8. The wireless access point according to claim 7, wherein the processor is configured to determine, in response to a preset condition being met, not to send, to the station in response to the probe request frame, any probe response frame that corresponds to any SSID of the SSID set other than the SSID associated with the station.

9. The wireless access point according to claim 8, wherein the preset condition comprises a cumulative quantity of received probe request frames sent by the station does not reach a preset quantity threshold.

10. The wireless access point according to claim 8, wherein the preset condition comprises that cumulative duration is less than a preset duration threshold.

11. The wireless access point according to claim 7, wherein the MAC address set comprises a plurality of MAC addresses.

12. The wireless access point according to claim 7, wherein the station is associated with a second wireless access point, and the SSID associated with the station is an SSID of the second wireless access point.

13. The wireless access point according to claim 12, wherein the SSID associated with the station is one of multiple SSIDs of the second wireless access point.

14. The wireless access point according to claim 7, further comprising a non-transitory computer readable storage medium storing a program for execution by the processor, the program including instructions to query, according to the MAC address of the station, the mapping relationship between the MAC address set and the SSID set, to obtain the SSID associated with the station.

15. A non-transitory computer readable storage medium storing a program for execution by a processor of a wireless access point, the program including instructions to:
receive a probe request frame sent by a station, wherein a transmitter address of the probe request frame is a medium access control (MAC) address of the station, a basic service set identifier (BSSID) in the probe request frame is a wildcard BSSID, and a service set identifier (SSID) in the probe request frame is a wildcard SSID, and wherein the wireless access point is a first wireless access point;
query, according to the MAC address of the station, a mapping relationship between a MAC address set and an SSID set, to obtain the SSID associated with the station, wherein the SSID set comprises a plurality of SSIDs of the wireless access point; and
reply to the station with a first probe response frame corresponding to the SSID associated with the station, wherein the SSID associated with the station is the only SSID of the SSID set that corresponds to a probe response frame that is sent to the station in response to the probe request frame.

16. The non-transitory computer readable storage medium of claim 15, wherein the instructions to reply to the station with the first probe response frame corresponding to the SSID associated with the station, wherein the SSID associated with the station is the only SSID of the SSID set that corresponds to a probe response frame that is sent to the station in response to the probe request frame, comprise instructions to determine, in response to a preset condition being met, not to send, to the station in response to the probe request frame, any probe response frame that corresponds to any SSID of the SSID set other than the SSID associated with the station.

17. The non-transitory computer readable storage medium according to claim 16, wherein the preset condition is selected from the group consisting of:
a cumulative quantity of received probe request frames sent by the station not reaching a preset quantity threshold; and
a cumulative duration being less than a preset duration threshold.

18. The non-transitory computer readable storage medium according to claim 15, wherein the MAC address set comprises a plurality of MAC addresses.

19. The non-transitory computer readable storage medium according to claim 15 wherein the station is associated with a second wireless access point, and the SSID associated with the station is an SSID of the second wireless access point, or one of multiple SSIDs of the second wireless access point.

20. The method according to claim 1, wherein querying, by the first wireless access point according to the MAC address of the station, the mapping relationship between the MAC address set and the SSID set, to obtain the SSID associated with the station, comprises:

in response to the SSID in the probe request frame being the wildcard SSID, querying, by the first wireless access point according to the MAC address of the station, the mapping relationship between the MAC address set and the SSID set, to obtain the SSID associated with the station.

* * * * *